United States Patent [19]

Tomatsuri

[11] Patent Number: 5,055,940
[45] Date of Patent: Oct. 8, 1991

[54] VIDEO MEMORY CONTROL APPARATUS

[75] Inventor: Koichi Tomatsuri, Katsuta, Japan

[73] Assignee: Hitachi, Ltd., Tokyo, Japan

[21] Appl. No.: 419,955

[22] Filed: Oct. 11, 1989

[30] Foreign Application Priority Data

Oct. 14, 1988 [JP] Japan .................................. 63-257125

[51] Int. Cl.$^5$ ............................................. H04N 1/40
[52] U.S. Cl. ..................................... 358/444; 358/443
[58] Field of Search ................ 358/401, 404, 409, 443, 358/444, 75, 78, 410

[56] References Cited

U.S. PATENT DOCUMENTS

| 4,563,706 | 1/1986 | Nagashima | 358/444 |
| 4,570,187 | 2/1986 | Ono et al. | 358/75 |
| 4,717,963 | 1/1988 | Koizumi | 358/444 |
| 4,864,391 | 9/1989 | Taguchi | 358/75 |
| 4,868,643 | 9/1989 | Taguchi | 358/75 |
| 4,908,719 | 3/1990 | Nonoyama | 358/401 |

FOREIGN PATENT DOCUMENTS 55-45218  3/1980  Japan .................................. 358/444

Primary Examiner—Joseph A. Orsino
Assistant Examiner—Thomas D. Lee
Attorney, Agent, or Firm—Antonelli, Terry, Stout & Kraus

[57] ABSTRACT

A video memory control apparatus has a frame memory in a video printer or the like constituted by two field memories. The two field memories are arranged so as to be switched in response to a signal obtained by frequency-dividing a vertical synchronizing signal into halves. At this time, not only the respective outputs of the two field memories are switched but also the supply of clock pulses for writing/reading is switched in response to the frequency-divided signal.

6 Claims, 2 Drawing Sheets

VIDEO MEMORY CONTROL APPARATUS

BACKGROUND OF THE INVENTION

The present invention relates to a video memory control apparatus for performing high speed writing/reading of a video signal onto/from a plurality of memories.

As an example of a conventional video memory control apparatus of the type described above, there is that disclosed, for example, in JP-B-63-24352 (corresponding to JP-A-56-46368 laid open Apr. 27, 1981).

In this prior art reference, a description is made pertaining writing and reading with respect to a video memory having a capacity for storing data by one field. In a video printer, however, a plurality of field memories are required if it is intended to store the next picture while a picture is being printed. In the above-mentioned prior art reference, problems such as current consumption of a memory circuit, unnecessary radiation, and so on, caused in the case where a plurality of field memories are switched to read data therefrom, are left out of consideration.

SUMMARY OF THE INVENTION

It is therefore an object of the present invention to provide a video memory control apparatus in which the current consumption as well as the generation of undesirable noise are reduced in the case where one frame memory is constituted by two field memories or in the case where the outputs of a plurality of memories are selectively used.

In order to attain the above object, according to an aspect of the present invention, in the case where the outputs of a plurality of memories are selectively used, the clock supply to the memories which are not being selected is stopped to thereby reduce noise such as caused by unnecessary radiation and to reduce the current consumption of the memories.

Generally, a memory is constituted by an IC (integrated circuit), and, particularly, when it is constituted by a C-MOS IC, a current flows in the memory in a transient state in which logic changes. Accordingly, as a driving clock frequency becomes high, the number of times that the state changes increases so that the current consumption of the memory increases, and at the same time, high harmonics of an integer number of times of the clock frequency are generated.

In the case where the outputs of memory ICs are selectively used, for example, when one frame memory is constituted by two field memories, and when the outputs of the two field memories are switched so as to be alternately used in response to a signal obtained by frequency-dividing a vertical synchronizing signal into halves, a read clock for reading operation is switched to be alternately supplied to a selected one of the two field memories. Accordingly, no change occurs in the output state of the field memory to which no clock is being supplied and therefore no high harmonics in synchronism with the clock occur and no increase occurs in the current consumption.

BRIEF DESCRIPTION OF THE DRAWINGS

Other features and advantages of the present invention will be apparent from the following description taken in connection with the accompanying drawings, wherein.

DESCRIPTION OF THE PREFERRED EMBODIMENT

Figure 1:
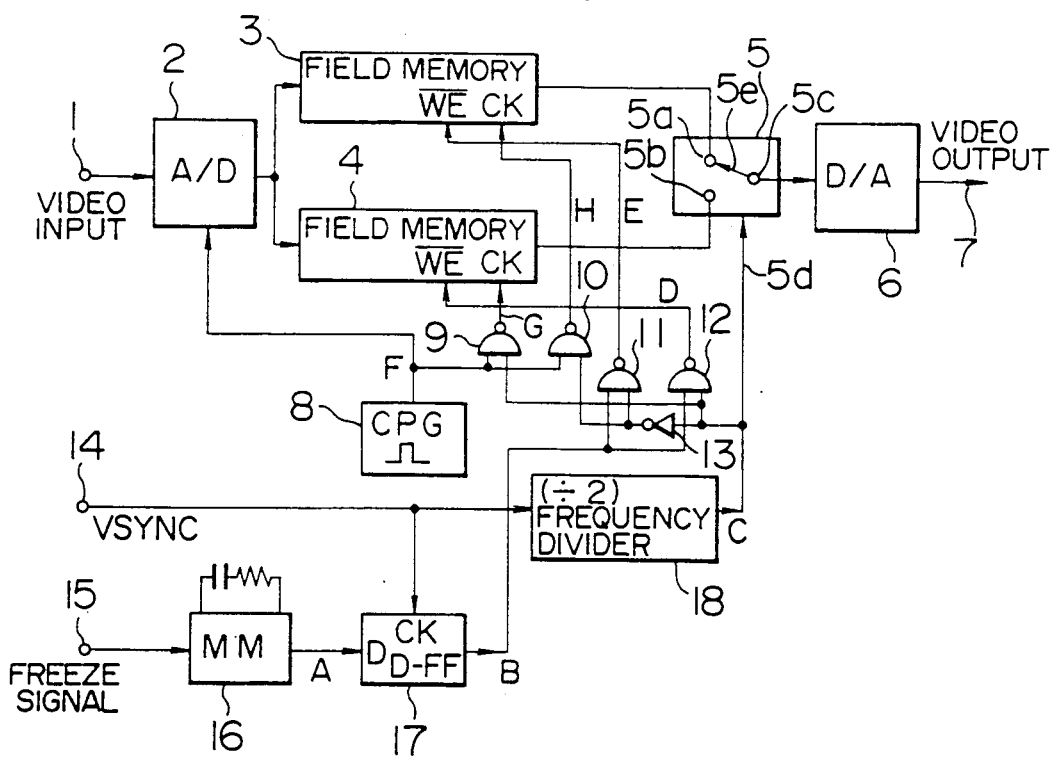
FIG. 1 is a circuit diagram illustrating an embodiment of t video memory control apparatus according to the present invention.

Referring to FIG. 1, an embodiment of the present invention will be described in detail hereunder. In the drawing, a video signal applied to a video input terminal 1 is A/D converted in an A/D converter 2 and then stored in field memories 3 and 4. The output of the field memory 3 is connected to an input terminal 5a of a selection switch 5, the output of the field memory 4 is connected to another input terminal 5b of the selection switch 5, and an output terminal 5c of the selection switch 5 is connected to an input terminal of a D/A converter 6 in the next stage. When an ordinary television signal is sampled by 500-600 dots for every horizontal period, the clock frequency of a clock pulse generator 8 is set to about 10-14 MHz. The A/D converter 2 analog-to-digitally converts the input video signal by using the clock supplied from the clock pulse generator 8. A vertical synchronizing signal VSYNC applied to a vertical synchronizing signal input terminal 14 is frequency-divided into halves by a ½ frequency divider 18. In other words, the ½ frequency divider 18 produces a frequency-divisional output signal C which is shown in the diagram C of FIG. 2. The output signal C of the frequency divider 18 is applied to a control terminal 5d of the selection switch 5 so as to control a selector member 5e of the selection switch 5. More specifically, the selector member 5e selects the input terminal 5a and hence the memory 4 in the periods of a-b and c-d, while selects the input terminal 5b and hence the memory in the periods of b-c and d-e.

Figure 2:
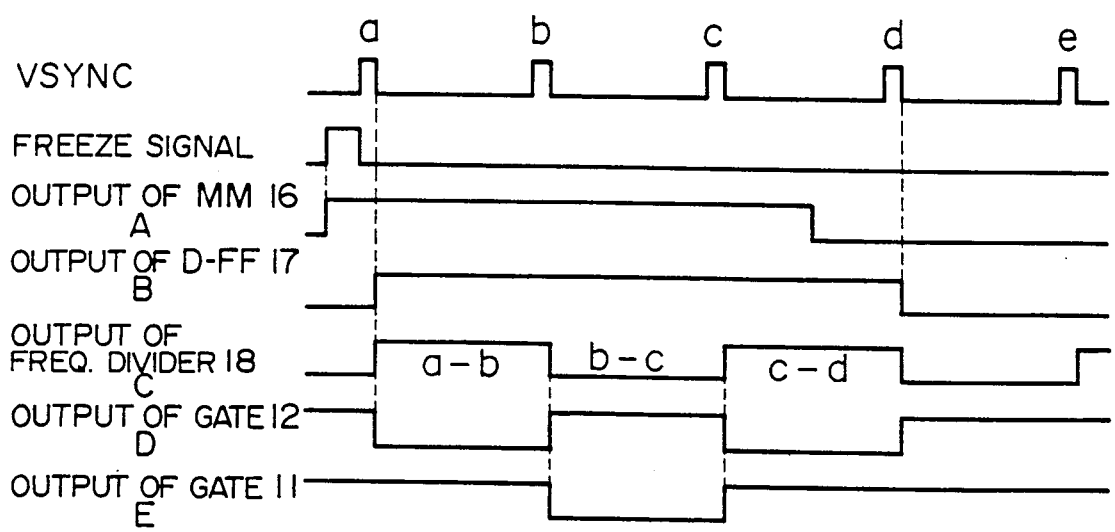
FIG. 2 is a timing chart showing the relationship between the vertical synchronizing signal and the memory output switching signal.

When the output of the A/D converter 2 is to be stored in the memories 3 and 4, a monostable multivibrator (MM) 16 is triggered by a freeze signal externally applied to a memory signal input terminal 15 so that the monostable multivibrator 16 produces an output signal A having a period longer than two VSYNC periods as shown in the diagram A of FIG. 2. The output signal A of the monostable multivibrator 16 is applied to a D-type flip-flop 17 so that the flip-flop 17 produces an output signal B in synchronism with the vertical synchronizing signal VSYNC as shown in the diagram B of FIG. 2. The output signal C of the ½ frequency divider 18 and the output signal B of the D-type flip-flop 17 are subject to logical processing in NAND gates 11 and 12 so that the NAND gates 11 and 12 produce output signals E and D respectively in synchronism with the vertical synchronizing signal VSYNC as shown in the diagrams E and D of FIG. 2, the output signals E and D being applied to the memories 3 and 4 as write enable signals ($\overline{WE}$) therefor. The write enable signals are alternately switched every vertical synchronizing period as shown in the diagrams D and E of FIG. 2. It is now assumed that the output data of the A/D converter 2 is written in the memories 3 and 4 in the respective low periods of the write enable signals, that is, the output signals E and D of the NAND gates 11 and 12 shown in the diagrams E and D of FIG. 2, respectively. As seen in FIG. 2, the signal D has two low periods so that data are written twice in the memory 4 and the second written data are left in the memory 4. Similarly, if the period of the output signal A of the monostable multivibrator is made more longer, the operation is performed in the same manner.

The clock CK to be used for writing the output data of the A/D converter 2 into the memories 3 and 4 is supplied from the clock pulse generator 8 for producing a sampling clock for the A/D converter 2. In fashion, the clock CK to be used for reading data from the memories 3 and 4 is also supplied from the clock pulse generator 8.

Conventionally, the clock pulse from the clock pulse generator 8 is applied to the respective CK terminals of the memories 3 and 4 directly or after merely being inverted without being passed through NAND gates 9 and 10.

Figure 3:
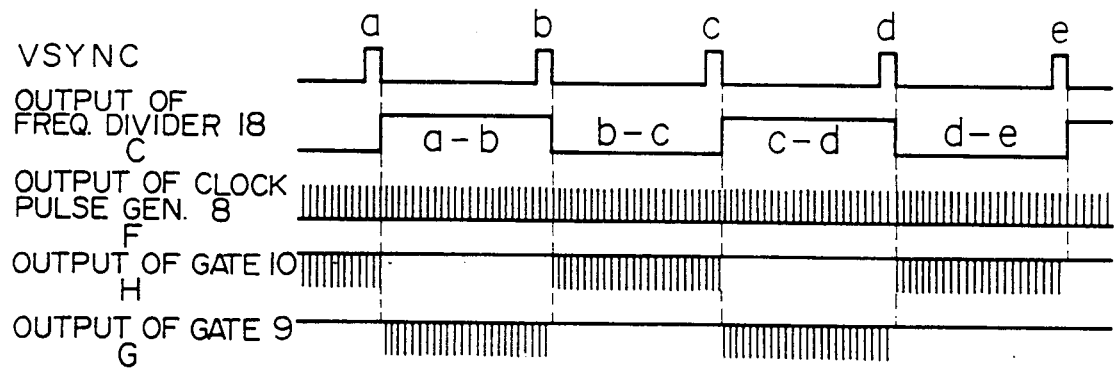
FIG. 3 is a timing chart showing the relationship between the vertical synchronizing signal and the clock signal applied to the memory circuit.

A feature of the present invention is in that the NAND gates 9 and 10 are inserted so that the clock pulse from the clock pulse generator 8 is alternatively applied to either one of the memories 3 and 4 in response to a signal obtained by frequency-dividing the vertical synchronizing signal VSYNC into halves, that is, the output signal C of the ½ frequency divider 18. As shown in FIG. 3, the output signal F of the clock pulse generator (CPG) 8 is distributed so as to form output signals H and G of the NAND gates 10 and 9 in response to the output signal C of the ½ frequency divider 18. Accordingly, the output state of either one of the memories 3 and 4 which is not being supplied with the clock does not change so that no noise synchronized with the clock is generated and the current consumption can be made smaller than in the case where both the memories are supplied with the clock at the same time.

Although FIG. 1 illustrates the A/D converter 2 having a one-bit output, the invention is applicable in quite the same manner to a case where the A/D converter 2 has an output of a plurality of bits, and in the latter case the clock is parallelly applied to the memories for the plurality of bits. Further, although FIG. 1 illustrates two memories each acting as a field memory, the present invention may be applicable in the same manner to a case where one field memory is constituted by a plurality of serially connected memories.

Although two field memories are switched in the above embodiment, the present invention is applicable to a case where the respective outputs of more than two memories are switched as to select one of the outputs as an output of the memory circuit. In this case, the supply of clock to the memories which are not being selected is stopped.

Figure 4:
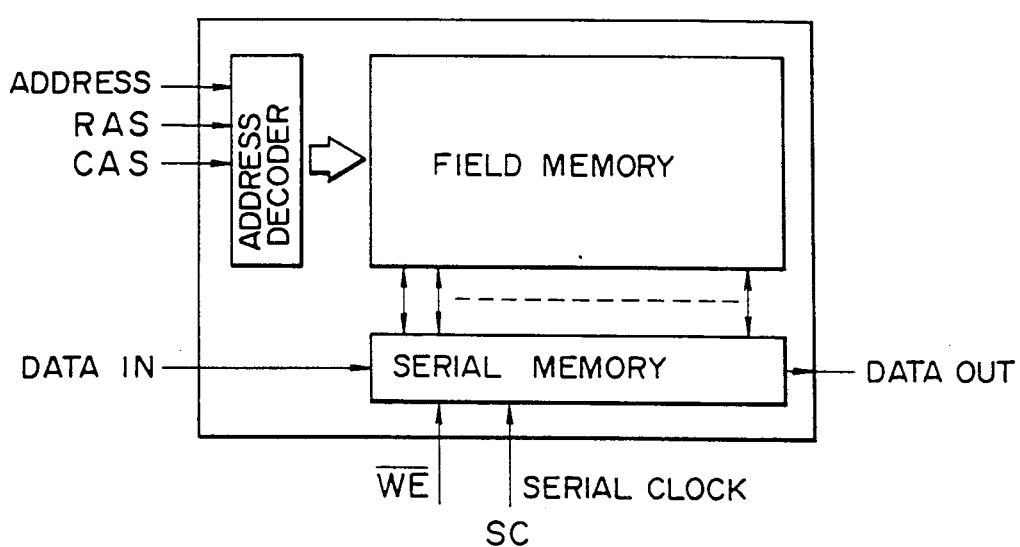
FIG. 4 is a circuit diagram illustrating the serial access memory.

FIG. 4 shows an example of the memory to be used according to the present invention. Data to be written are written by one line into a serial memory at a high speed in response to a serial clock SC and then the data are transferred by one line to a field memory. In reading the data from the field memory, data by one line designated by an address decoder are transferred at the same time to the serial memory and read out therefrom as an output DATAOUT. The same applies to the case of a memory which can be subject to random access as well as serial access.

In the case where respective outputs DATAOUT of a plurality of such memories are switched so as to be alternatively used, the serial clock SC is switched so that the clock is supplied to only the memory to which access is made.

In the video memory control apparatus according to the present invention having such a configuration as described above, since all the memories are not driven at the same time by a high speed clock, noises generated in synchronism with the clock can be reduced. Further, in the case where each memory is constituted by a C-MOS IC or the like, the current consumption of the memory IC can be reduced.

I claim:

1. A video memory control apparatus comprising:
   a plurality of memories;
   a selection circuit for selectively outputting respective outputs of said plurality of memories;
   a clock pulse generation circuit for generating a clock pulse signal to be supplied to said plurality of memories for performing at least one of writing a video signal into said plurality of memories and reading said video signal from said plurality of memories;
   supply means for supplying said plurality of memories with said clock pulse signal generated by said clock pulse generation circuit to thereby perform at least one of said writing and reading of said video signal;
   selection means for controlling said selection circuit based on a signal relating to a vertical synchronizing signal of said video signal to thereby select one of said plurality of memories so as to derive a video signal output of said selected one memory as an output of said selection circuit; and
   stop means for stopping supply of said clock pulse signal to said plurality of memories except for said one memory selected by said selection means.

2. A video memory control apparatus according to claim 1, wherein said plurality of memories are respectively constituted by integrated circuits;
   said selection circuit includes a plurality of input terminals correspondingly connected to respective outputs of said plurality of integrated circuits, an output terminal, and a selector member;
   said selection means acts to control said selector member based on a vertical synchronizing signal of said video signal so as to cause said selector member to select one of said plurality of input terminals; and
   said stop means acts to stop supply of a clock pulse signal which is to be supplied, for dealing with said video signal, to said plurality of input terminals except for said selected one input terminal and then to at least one of said plurality of memories.

3. A video memory control apparatus according to claim 1, wherein said plurality of memories includes two C-MOS integrated circuits.

4. A video memory control apparatus comprising:
   a plurality of memories;
   a selection circuit for selectively outputting respective outputs of said plurality of memories;
   a clock pulse generation circuit for generating a clock pulse signal to be supplied to said plurality of memories for performing at least one of writing a video signal into said plurality of memories and reading said video signal from said plurality of memories;
   supply means for supplying said plurality of memories with said clock pulse signal generated by said clock pulse generation circuit to thereby perform at least one of said writing and reading of said video signal;

first control means for controlling said selection circuit based on a signal relating to a vertical synchronizing signal or said video signal to thereby select one of said plurality of memories so as to derive a video output of said selected one memory as an output of said selection circuit; and second control means which allows said clock pulse to be supplied to said one memory selected by said first control means but does not allow said clock pulse signal to be supplied to said plurality of memories other than said selected one memory.

5. A video memory control apparatus according to claim 4, wherein said plurality of memories are respectively constituted by integrated circuits;

said selection circuit includes a plurality of input terminals correspondingly connected to respective outputs of said plurality of integrated circuits, an output terminal, and a selector member;

said first control means acts to control said selector member based on a vertical synchronizing signal of said video signal so as to cause said selector member to select one of said plurality of input terminals; and said second control means allows said clock pulse signal to be supplied to said one selected input terminal and does not allow said clock pulse signal to be supplied to said plurality of input terminals except for said selected one input terminal.

6. A video memory control apparatus according to claim 5, wherein said plurality of memories include two C-MOS integrated circuits.

* * * * *